US012807807B2

(12) United States Patent
Xu et al.

(10) Patent No.: US 12,807,807 B2
(45) Date of Patent: Nov. 24, 2026

(54) COMPOSITION INCLUDING POLYESTER RESIN AND VINYL ESTER AND METHOD OF USING THE SAME

(71) Applicant: 3M INNOVATIVE PROPERTIES COMPANY, St. Paul, MN (US)

(72) Inventors: Ruijian Xu, Woodbury, MN (US); Yu Yang, Eden Prairie, MN (US); Mark F. Schulz, Lake Elmo, MN (US); Andrew D. Norlander, Woodbury, MN (US); Richard J. Pokorny, Maplewood, MN (US); Felton L. Smith, Stedman, NC (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1037 days.

(21) Appl. No.: 17/415,853

(22) PCT Filed: Dec. 18, 2019

(86) PCT No.: PCT/IB2019/061026

§ 371 (c)(1),
(2) Date: Jun. 18, 2021

(87) PCT Pub. No.: WO2020/128904

PCT Pub. Date: Jun. 25, 2020

(65) Prior Publication Data

US 2022/0081555 A1 Mar. 17, 2022

Related U.S. Application Data

(60) Provisional application No. 62/795,936, filed on Jan. 23, 2019, provisional application No. 62/783,039, filed on Dec. 20, 2018.

(51) Int. Cl.

| | |
|---|---|
| ***C08L 67/06*** | (2006.01) |
| ***C08F 218/04*** | (2006.01) |
| ***C08F 218/08*** | (2006.01) |
| ***C08F 218/10*** | (2006.01) |
| ***C08F 283/01*** | (2006.01) |
| ***C08K 3/26*** | (2006.01) |
| ***C08K 3/36*** | (2006.01) |
| ***C08K 5/098*** | (2006.01) |
| ***C08K 5/14*** | (2006.01) |
| ***C08K 5/18*** | (2006.01) |
| ***C08K 7/28*** | (2006.01) |

(52) U.S. Cl.

CPC ............ *C08L 67/06* (2013.01); *C08F 218/08* (2013.01); *C08F 283/01* (2013.01); *C08K 3/26* (2013.01); *C08K 3/36* (2013.01); *C08K 5/098* (2013.01); *C08K 5/14* (2013.01); *C08K 5/18* (2013.01); *C08K 7/28* (2013.01); *C08F 218/04* (2013.01); *C08F 218/10* (2013.01); *C08K 2003/265* (2013.01); *C08K 2201/019* (2013.01)

(58) Field of Classification Search

CPC ...... C08L 67/06; C08F 283/01; C08F 218/04; C08F 218/08; C08F 218/10

See application file for complete search history.

(56) References Cited

U.S. PATENT DOCUMENTS

| | | | |
|---|---|---|---|
| 3,072,678 | A | 1/1963 | Porret |
| 3,883,612 | A | 5/1975 | Pratt |
| 4,289,684 | A | 9/1981 | Kallaur |
| 4,409,360 | A | 10/1983 | Hefner, Jr. |
| 4,443,580 | A | 4/1984 | Hefner, Jr. |
| 4,626,570 | A | 12/1986 | Gardner |
| 4,745,141 | A | 5/1988 | Akiyama |
| 4,777,196 | A | 10/1988 | Hefner, Jr. |
| 4,980,414 | A | 12/1990 | Naton |
| 5,068,125 | A | 11/1991 | Meixner |
| 5,120,785 | A | 6/1992 | Walker |
| 5,248,742 | A | 9/1993 | McGarry |
| 5,360,863 | A | 11/1994 | Meixner |
| 5,373,036 | A | 12/1994 | Parish |
| 5,395,866 | A | 3/1995 | Ross |
| 5,456,947 | A | 10/1995 | Parish |
| 5,492,668 | A | 2/1996 | Smeal |
| 5,534,211 | A | 7/1996 | Smeal |
| 6,037,408 | A | 3/2000 | Weber |
| 6,063,864 | A | 5/2000 | Mathur |
| 6,165,557 | A | 12/2000 | Blum |

(Continued)

FOREIGN PATENT DOCUMENTS

| | | |
|---|---|---|
| EP | 0322808 | 7/1989 |
| EP | 0783026 | 7/1997 |

(Continued)

OTHER PUBLICATIONS

Machine translation of JP-2005239950-A obtained from Espacenet (Year: 2005).*

"2.2-Bis[4-(Methacryloxy Ethoxy)Phenyl] Propane", Kimberlite Softwares, [retrieved from the Internet on Sep. 25, 2018], URL <https://www.worldofchemicals.com/chemicals/chemical-properties/22-bis4 methacry1oxy-ethoxyphenylpropane.html>, 2018, pp. 1-2, XP002785052.

International Search Report for PCT International Application No. PCT/IB2019/061026, mailed on Mar. 25, 2020, 4 pages.

*Primary Examiner* — Kregg T Brooks
*Assistant Examiner* — David R. Foss
(74) *Attorney, Agent, or Firm* — Kathleen B. Gross

(57) ABSTRACT

The composition includes at least one of a dicyclopentadiene-modified unsaturated polyester resin or an ethylene glycol fumarate unsaturated polyester resin; a vinyl ester represented by formula R—[C(O)—O—CH=$CH_2]_n$ wherein R is alkyl, aryl, or a combination thereof, and n is 1 or 2; a tertiary amine; and inorganic filler. A method of repairing a damaged surface using the composition is also described.

20 Claims, No Drawings

(56) References Cited

U.S. PATENT DOCUMENTS

| | | | |
|---|---|---|---|
| 6,384,151 B1 | 5/2002 | Matsukawa | |
| 6,472,069 B1 | 10/2002 | Bailey | |
| 6,515,071 B1 | 2/2003 | Riley | |
| 6,855,748 B1 | 2/2005 | Hatton | |
| 7,326,752 B2 | 2/2008 | McAlvin | |
| 7,396,882 B2 | 7/2008 | Hewitt | |
| 8,034,852 B2 | 10/2011 | Janssen | |
| 8,283,428 B2 | 10/2012 | Brant | |
| 8,372,926 B2 | 2/2013 | Palmese | |
| 8,906,999 B2 | 12/2014 | Hsu | |
| 9,221,981 B2 | 12/2015 | Adams | |
| 10,927,273 B2 | 2/2021 | Xu | |
| 2002/0055597 A1 | 5/2002 | Hsu | |
| 2002/0072574 A1 | 6/2002 | Hsu | |
| 2003/0057406 A1 | 3/2003 | Yang | |
| 2004/0068088 A1 | 4/2004 | Loza | |
| 2004/0170850 A1 | 9/2004 | Nava | |
| 2010/0093911 A1 | 4/2010 | Guha | |
| 2013/0261254 A1* | 10/2013 | Mullen | C08L 63/10 525/445 |
| 2013/0324640 A1 | 12/2013 | Parish | |
| 2017/0152337 A1 | 6/2017 | Piestert | |
| 2018/0009926 A1* | 1/2018 | Kuroki | C09D 201/02 |
| 2018/0016435 A1 | 1/2018 | Adams | |
| 2018/0265735 A1 | 9/2018 | Xu | |
| 2022/0081556 A1 | 3/2022 | Yang | |

FOREIGN PATENT DOCUMENTS

| | | | | |
|---|---|---|---|---|
| EP | 0879856 A1 * | 11/1998 | C09D 5/34 |
| EP | 1333041 | 8/2003 | |
| EP | 1403298 | 3/2004 | |
| GB | 0950285 | 2/1964 | |
| GB | 0951399 | 3/1964 | |
| GB | 0982151 | 2/1965 | |
| GB | 2120653 | 12/1983 | |
| GB | 2284424 | 6/1995 | |
| JP | 3021493 | 3/2000 | |
| JP | 3146598 | 3/2001 | |
| JP | 3461075 | 10/2003 | |
| JP | 3539460 | 7/2004 | |
| JP | 2005239950 A * | 9/2005 | |
| JP | 2005255937 | 9/2005 | |
| WO | WO 1995-019379 | 7/1995 | |
| WO | WO-9519379 A1 * | 7/1995 | C08G 63/553 |
| WO | WO 1998-022961 | 5/1998 | |
| WO | WO 2010-027728 | 3/2010 | |
| WO | WO 2019-016704 | 1/2019 | |

* cited by examiner

COMPOSITION INCLUDING POLYESTER RESIN AND VINYL ESTER AND METHOD OF USING THE SAME

CROSS-REFERENCE TO RELATED APPLICATION

This application is a national stage filing under 35 U.S.C. 371 of PCT/IB2019/061026, filed Dec. 18, 2019, which claims priority to U.S. Provisional Application Nos. 62/783,039, filed Dec. 20, 2018, and 62/795,936, filed Jan. 23, 2019, the disclosures of which are incorporated by reference in their entirety herein.

BACKGROUND

Automobile body repair is often carried out with a body repair compound, also called body filler. A body repair compound can include a thermosetting resin, fillers, promoters, and other additives that are mixed with a catalyst to facilitate cross-linking at room temperature. After mixing, a technician spreads the body filler onto a damaged surface, allows the body filler to harden, and then sands the hardened body filler to conform to the desired surface contour. The process can be repeated two or more times until the damaged area of the vehicle is sufficiently filled, and the contour of the original surface is matched.

Automotive body fillers often include unsaturated polyester resins. Unsaturated polyester resins typically contain α,β-unsaturated polyesters and 30 to 50 percent by weight copolymerizable monomers. Styrene, due to its well-understood reactivity profiles with unsaturated polyester resins and other monomers and its relatively low cost, is by far the dominant copolymerizable monomer used in unsaturated polyester resins. Styrene has a relatively high volatility which results in its being released from both uncured resins at room temperature and at much higher rates during cure. The Environmental Protection Agency (EPA) included styrene in its Toxic Release Inventory (TRI) in 1987 and classifies it as a possible carcinogen. Organizations such as the Occupational Safety and Health Administration (OSHA) and the Clean Air Act Amendments (CAAA) have included styrene in a list of volatile organic compounds to which exposure should be limited.

Some styrene-free body filler compositions have been described. See, for example, JP2005255937, published Sep. 22, 2005, and U.S. Pat. No. 5,068,125 (Meixner et al.). Certain acrylate and methacrylate monomers and vinyl ethers have been suggested as equivalents for styrene in body filler applications. See, for example, U.S. Pat. No. 4,745,141 (Akiyama et al.), UK Pat. Appl. GB 2284424, published Jun. 7, 1995, and U.S. Pat. No. 6,063,864 (Mathur et al.).

SUMMARY

The present disclosure provides a composition that includes a polyester resin, a vinyl ester, a tertiary amine catalyst, and inorganic filler. The polyester includes a dicyclopentadiene-modified polyester resin, an ethylene glycol/fumaric acid polyester resin, or both of these. The composition can be cured using free radical polymerization at ambient conditions and can be formulated as a body filler. The composition can provide curing, adhesion, and sanding properties useful for body fillers and does not require styrene. The composition can further include other reactive diluents (e.g., acrylates, methacrylates, and vinyl ethers) and functional compounds (e.g., having mercaptan, epoxy, or amino groups).

In one aspect, the present disclosure provides a composition including an unsaturated polyester resin, a vinyl ester represented by formula R—[C(O)—O—CH═$CH_2$]$_n$, wherein R is alkyl, aryl, or a combination thereof and n is 1 or 2, a tertiary amine, and inorganic filler. The unsaturated polyester resin comprises at least one of a dicyclopentadiene-modified unsaturated polyester resin or a fumaric acid/ethylene glycol polyester resin.

The composition can be packaged, for example, as a two-part body repair composition, wherein a first part includes the composition and a second part includes at least one of an organic peroxide or organic hydroperoxide.

In another aspect, the present disclosure provides a cured composition prepared from such a composition.

In another aspect, the present disclosure provides a method of repairing a damaged surface. The method includes combining the composition described above with at least one of an organic peroxide or organic hydroperoxide, applying the composition comprising the organic peroxide or hydroperoxide to the damaged surface; and curing the composition on the damaged surface.

In this application:

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

"Alkyl group", "alkenyl group" and the prefix "alk-" are inclusive of both straight chain and branched chain groups. In some embodiments, alkyl groups have up to 30 carbons (in some embodiments, up to 20, 15, 12, 10, 8, 7, 6, or 5 carbons) unless otherwise specified.

"Alkylene" is the multivalent (e.g., divalent or trivalent) form of the "alkyl" groups defined above. "Alkenylene" is the multivalent (e.g., divalent or trivalent) form of the "alkenyl" groups defined above.

"Arylalkylene" refers to an "alkylene" moiety to which an aryl group is attached. "Alkylarylene" refers to an "arylene" moiety to which an alkyl group is attached.

The phrase "interrupted by at least one —O— group", for example, with regard to an alkyl, alkenyl, alkylene, or alkenylene group refers to having part of the alkyl or alkylene on both sides of the —O— group. For example, —$CH_2CH_2$—O—$CH_2$—$CH_2$— is an alkylene group interrupted by an —O—. This definition applies to the other functional groups recited herein (e.g., —N(H)—, —N(H)—C(O)—, etc.).

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

The term (meth)acrylate refers to an acrylate, a methacrylate, or a combination thereof. Similarly, the term (meth) acrylic refers to acrylic, a methacrylic, or a combination thereof.

The term "liquid" refers to being able to flow at room temperature.

Flash point is determined by the ASTM D93 Pensky-Martens method.

A "volatile organic compound" is a compound having at least one carbon atom that participates in atmospheric photochemical reactions. Unless otherwise specified, a volatile organic compound has at least one of a vapor pressure of greater than 0.1 mm Hg at 20° C. or a boiling point of less than 216° C.

All numerical ranges are inclusive of their endpoints and non-integral values between the endpoints unless otherwise stated (e.g., 1 to 5 includes 1, 1.5, 2, 2.75, 3, 3.80, 4, 5, etc.).

DETAILED DESCRIPTION

In some embodiments, the composition of the present disclosure includes a dicyclopentadiene-modified unsaturated polyester resin. Unsaturated polyester resins have at least one α,β-unsaturated ester group. Unsaturated α,β-unsaturated ester groups have the formula C═C—C(O)—O—. The terminal carbon of the double bond may be bonded to two hydrogen atoms, making it a terminal olefin group, or one or two other carbon atoms, making it an internal olefin. The terminal oxygen of the ester group is typically bonded to a carbon atom in the resin. Dicyclopentadiene has been used to modify unsaturated polyester resins in various ways. For example, cracking dicyclopentadiene (e.g., heating at a temperature of at least 140° C.) forms cyclopentadiene, which can undergo a Diels-Alder reaction with maleic acid or maleic anhydride to form nadic acid or nadic anhydride groups in the polyester backbone. In another example, maleic acid can react with one or fewer equivalents of dicyclopentadiene to form a dicyclopentenyl monoester of maleic acid. The reaction is typically carried out at a temperature lower than 140° C. to avoid cracking the dicyclopentadiene. The dicyclopentenyl monoester can then be combined with a dihydroxy compound and optionally an unsaturated dicarboxylic acid or an anhydride thereof such as those described below to provide a dicyclopentenyl-end-capped polyester resin. Some illustrative dicyclopentadiene-modified unsaturated polyester-based compositions are described in Int. Pat. Appl. Pub. No. WO 95/19379 (Ruggeberg). In some embodiments, the dicyclopentadiene-modified unsaturated polyester resin is substantially free of allyl ether groups such as those described in U.S. Pat. No. 4,745,141 (Akiyama et al.).

In some embodiments, the composition of the present disclosure includes an ethylene glycol fumarate unsaturated polyester resin. The ethylene glycol fumarate unsaturated polyester resin can be a diethylene glycol fumarate resin, a triethylene glycol fumarate resin, or a poly(ethylene glycol) fumarate resin in additional to an ethylene glycol fumarate resin. The ethylene glycol fumarate resin can be represented by formula H—$(OCH_2CH_2)_p$—O—[C(O)—CH═CH—C(O)—$(OCH_2CH_2)_p$—O$]_m$H, wherein the double bond is a trans double bond, and wherein m and p are selected so that the resin has any of the molecular weights described below. The ethylene glycol fumarate resin generally comprises at least a portion represented by formula —$(OCH_2CH_2)_p$—O—[C(O)—CH═CH—C(O)—$(OCH_2CH_2)_p$—O$]_m$—, wherein the double bond is a trans double bond, and wherein m is from 1 to 100 and p is in a range from 1 to 10. In some embodiments of either of these formulas, p is in a range from 1 to 10, 1 to 5, or 1 to 3. In some embodiments, m is in the range from 1 to 100, 1 to 50, 1 to 25, or 1 to 10. The composition of the present disclosure can also include a mixture of a dicyclopentadiene-modified unsaturated polyester resin and an ethylene glycol-fumarate unsaturated polyester resin.

Mixtures of dicyclopentadiene-modified unsaturated polyester resins (in some embodiments, dicyclopentenyl-end-capped polyester resin) and other polyester resins not modified with dicyclopentadiene are also useful, for example, to provide a cured composition with a desirable modulus. Mixtures of different unsaturated polyester resins may be useful in the composition according to the present disclosure. For example, a mixture of unsaturated polyesters made from different unsaturated dicarboxylic acids or anhydrides thereof and/or different dihydroxy compounds such as those described below can be useful.

Unsaturated polyester resins include a polyester generally formed by a polycondensation reaction of an unsaturated dicarboxylic acid or an anhydride thereof with a multifunctional hydroxy compound. Unsaturated dicarboxylic acids useful for preparing the unsaturated polyester resin typically include α,β-unsaturated acids and anhydrides thereof (e.g., maleic anhydride, maleic acid, fumaric acid, itaconic acid, citraconic acid, and citraconic anhydride). Other dicarboxylic acids or equivalents can also be included in the preparation of the unsaturated polyester resin. Examples include saturated aliphatic dicarboxylic acids having 4 to 10 carbon atoms such as succinic acid, adipic acid, sebacic acid and/or their anhydrides; cycloaliphatic dicarboxylic acids or dicarboxylic acid anhydrides having 8 to 10 carbon atoms such as tetrahydrophthalic acid, hexahydrophthalic acid, norbornene dicarboxylic acid and/or their anhydrides; and aromatic dicarboxylic acids or dicarboxylic acid anhydrides having 8 to 12 carbon atoms such as phthalic acid, phthalic anhydride, isophthalic acid, and terephthalic acid. Examples of hydroxy compounds useful for making unsaturated polyester resins include 1,2-propanediol, 1,3-propanediol, dipropylene glycol, diethylene glycol, ethylene glycol, 1,3-butanediol, 1,4-butanediol, neopentyl glycol, triethylene glycol, tripropylene glycol, and polyethylene glycols. In some embodiments, the hydroxy compounds used to make the unsaturated polyester resin excludes alkoxylated 2-butene-1,4-diol (e.g., those described in U.S. Pat. No. 5,360,863 (Meixner et al.).

The polyester resin useful for practicing the present disclosure (e.g., in combination with at least one of a dicyclopentadiene-modified unsaturated polyester resin or an ethylene glycol-fumarate polyester resin) may further include end-group modifications. For example, the polyester resin can be prepared in the presence of a vinyl monocarboxylic acid (e.g., acrylic acid, methacrylic acid, ethacrylic acid, halogenated acrylic or methacrylic acids, cinnamic acid, and combinations thereof) to provide vinyl end groups. In another example, allyl glycidyl ether and/or an unsaturated ether that is a monofunctional hydroxy compound with at least one beta, gamma-unsaturated alkenyl ether group can be useful for incorporating allyl ether end groups into the polyester resin. In some embodiments, a polyester resin used, for example, in combination with at least one of a dicyclopentadiene-modified unsaturated polyester resin or an ethylene glycol-fumarate polyester resin comprises allyl ether groups.

Unsaturated polyester resins useful for practicing the present disclosure can have a wide variety of molecular weights. In some embodiments, the unsaturated polyester resins can have weight average molecular weights in a range from 500 grams per mole to 20,000 grams per mole, 1000 grams per mole to 10,000 grams per mole, or 1000 grams per mole to 5,000 grams per mole, as measured by gel permeation chromatography using polystyrene standards. In some embodiments, the unsaturated polyester resins can have weight average molecular weights in a range from 500 grams per mole to 5,000 grams per mole, 1,000 grams per mole to 5,000 grams per mole, or 1000 grams per mole to 3,000 grams per mole, as measured by gel permeation chromatography using polystyrene standards or number average molecular weights in a range from 500 grams per mole to 5,000 grams per mole, 1,000 grams per mole to 5,000 grams per mole, or 1000 grams per mole to 3,000 grams per mole as calculated from the water collected from the condensation reaction. In some embodiments, the unsaturated polyester resin is liquid (e.g., at room temperature). Whether an unsaturated polyester resin is liquid can depend, for example, on its structure (e.g., backbone and end groups) and its molecular weight.

The synthesis of unsaturated polyesters occurs either by a bulk condensation or by azeotropic condensation in batch. The reaction can conveniently be carried out in a flask equipped with stirrer, condenser, and a jacket heater. The starting materials are typically added to the flask at room temperature and then slowly heated to a temperature in a range from 200° C. to 250° C. under conditions where water can be removed from the reaction mass to obtain desired molecular weight.

Illustrative unsaturated polyester-based compositions are described in U.S. Pat. No. 5,456,947 (Parish et al.); U.S. Pat. No. 4,980,414 (Naton); and U.S. Pat. No. 5,373,036 (Parish et al.). Some unsaturated polyester resins useful for practicing the present disclosure can be obtained from commercial sources, for example, Reichhold LLC, Durham, North Carolina; Polynt Composites, USA, Inc., North Kansas City, Missouri; AOC, LLC, Collierville, Tennessee; DSM Resins U.S., Inc., Augusta, Georgia; Ashland Specialty Chemical Co., Columbus, Ohio; Bayer Material Science LLC, Pittsburgh, Pennsylvania; Interplastic Corporation, St. Paul, Minnesota; and Deltech Corporation, Baton Rouge, Louisiana.

The composition according to the present disclosure can include a vinyl ester resin (e.g., in combination with at least one of a dicyclopentadiene-modified unsaturated polyester resin or an ethylene glycol-fumarate polyester resin). As would be understood by a person of ordinary skill in the art, a vinyl ester is a resin produced by the esterification of an epoxy resin with an unsaturated monocarboxylic acid. Epoxy vinyl ester resins are typically prepared, for example, by reacting a vinyl monocarboxylic acid (e.g., acrylic acid, methacrylic acid, ethacrylic acid, halogenated acrylic or methacrylic acids, cinnamic acid, and combinations thereof) and an aromatic polyepoxide (e.g., a chain-extended diepoxide or novolac epoxy resin having at least two epoxide groups) or a monomeric diepoxide. Useful epoxy vinyl ester resins typically have at least two end groups represented by formula $—CH_2—CH(OH)—CH_2—O—C(O)—C(R'')═CH(R')$, wherein R'' is hydrogen, methyl, or ethyl, wherein the methyl or ethyl group may optionally be halogenated, wherein R' is hydrogen or phenyl, and wherein the terminal $CH_2$ group is linked directly or indirectly to the aromatic group described below (e.g., through a phenolic ether functional group). The aromatic polyepoxide or aromatic monomeric diepoxide typically contains at least one (in some embodiments, at least 2, in some embodiments, in a range from 1 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Examples of aromatic epoxy resins useful for reaction with vinyl monocarboxylic acids include novolac epoxy resins (e.g., phenol novolacs, ortho-, meta-, or para-cresol novolacs or combinations thereof), bisphenol epoxy resins (e.g., bisphenol A, bisphenol F, halogenated bisphenol epoxies, and combinations thereof), resorcinol epoxy resins, and tetrakis phenylolethane epoxy resins. Examples of aromatic monomeric diepoxides useful for reaction with vinyl monocarboxylic acids include the diglycidyl ethers of bisphenol A and bisphenol F and mixtures thereof. In some embodiments, bisphenol epoxy resins, for example, may be chain extended to have any desirable epoxy equivalent weight. In some embodiments, the aromatic epoxy resin (e.g., either a bisphenol epoxy resin or a novolac epoxy resin) may have an epoxy equivalent weight of at least 140, 150, 200, 250, 300, 350, 400, 450, or 500 grams per mole. In some embodiments, the aromatic epoxy resin may have an epoxy equivalent weight of up to 2500, 3000, 3500, 4000, 4500, 5000, 5500, or 6000 grams per mole. In some embodiments, the aromatic epoxy resin may have an epoxy equivalent weight in a range from 150 to 6000, 200 to 6000, 200 to 5000, 200 to 4000, 250 to 5000, 250 to 4000, 300 to 6000, 300 to 5000, or 300 to 3000 grams per mole.

Several aromatic epoxy vinyl ester resins useful for the composition of the present disclosure are commercially available. For example, epoxy diacrylates such as bisphenol A epoxy diacrylates and epoxy diacrylates diluted with other acrylates are commercially available, for example, from Cytec Industries, Inc., Smyrna, GA, under the trade designation "EBECRYL". Aromatic epoxy vinyl ester resins such as novolac epoxy vinyl ester resins diluted with styrene are available, for example, from Ashland, Inc., Covington, KY, under the trade designation "DERAKANE" (e.g., "DERAKANE 470-300") and from Interplastic Corporation, St. Paul, MN, under the trade designation "CoREZYN" (e.g., "CoREZYN 8730" and "CoREZYN 8770").

The composition of the present disclosure can have at least 10, 20, 25, or at least 30 percent by weight of any of the unsaturated polyester resin described above, combination thereof, or combination with a vinyl ester resin described above. In some embodiments, the composition according to the present disclosure and/or useful for practicing the present disclosure can include up to 65, 60, 55, or 50 percent by weight of the unsaturated polyester resin described above, combination thereof, or combination with a vinyl ester resin described above. These percentages are based on the total weight of the composition including the unsaturated polyester resin, the vinyl ester, the tertiary amine, and the inorganic filler.

The composition of the present disclosure and/or useful for practicing the present disclosure includes a vinyl ester represented by formula R—[C(O)—O—CH═CH$_2$]$_n$, wherein R is alkyl, aryl, or a combination thereof and n is 1 or 2. Examples of suitable R groups in the vinyl esters include alkyl having up to 12, 11, 10, 9, 8, 6, or 4 carbon atoms, phenyl, and benzyl. In some embodiments, R is alkyl having up to 4 carbon atoms (e.g., methyl, ethyl, n-propyl, isopropyl, n-butyl, isobutyl, sec-butyl, or tert-butyl). In some embodiments, n is 1, and the vinyl ester is represented by formula R—C(O)—O—CH═CH$_2$. Examples of suitable vinyl esters represented by formula R—C(O)—O—CH═CH$_2$ include vinyl acetate, vinyl propionate, vinyl pivalate, and vinyl benzoate. In some embodiments, the vinyl ester is vinyl acetate, vinyl propionate, vinyl pivalate, or vinyl neodecanoate. In some embodiments, the vinyl ester is vinyl propionate or vinyl pivalate. In some embodiments, the vinyl ester is represented by formula R—C(O)—O—CH═CH$_2$, wherein R has more than one carbon atom. Increasing the number of carbon atoms in the vinyl ester advantageously increases its flashpoint. In some embodiments of R—C(O)—O—CH═CH$_2$, R is a branched alkyl group having from 3 to 12, 4 to 11, 4 to 10, 4 to 9, or 9 to 10 carbon atoms. Vinyl esters are commercially available from a number of chemical suppliers or can be prepared by known methods. Some useful vinyl esters are available from Hexion, Inc., Stafford, Tex., under the trade designation "VeoVa". In some embodiments, the flashpoint of the vinyl ester is at least 15° C., 20° C., 25° C., 50° C., 75° C., or 90° C.

The composition of the present disclosure and/or useful for practicing the present disclosure can have at least 1, 2.5, 5, or at least 10 percent by weight of any of the vinyl esters represented by formula R—[C(O)—O—CH═CH$_2$]$_n$ described above or combination thereof. In some embodiments, the vinyl ester is present in an amount of more than five percent by weight, based on the total weight of the composition. In some embodiments, the composition according to the present disclosure and/or useful for practicing the present disclosure can include up to 40, 35, 30, 25, or 20 percent by weight of any vinyl ester represented by formula R—[C(O)—O—CH═CH$_2$]$_n$. These percentages are based on the total weight of the composition including the unsaturated polyester resin, the vinyl ester, the tertiary amine, and the inorganic filler.

In some embodiments, the composition of the present disclosure and/or useful in the method of the present disclosure is substantially free of a vinyl aromatic compound having at least one vinyl substituent on an aromatic ring. In addition to the vinyl substituent, the vinyl aromatic compound may also include other substituents (e.g., alkyl, alkoxy, or halogen). Vinyl aromatic compounds having at least one vinyl substituent on an aromatic ring, typically a benzene ring or a naphthalene ring, are common diluents for polymer resins having at least one α,β-unsaturated ester group; however, they present some environmental health concerns as described above. Examples of such vinyl aromatic compounds include styrene, alpha-methyl styrene, p-methyl styrene, p-tert-butyl styrene, chlorostyrene, dichlorostyrene, p-ethoxystyrene, p-propoxystyrene, divinyl benzene, and vinyl naphthalene. "Substantially free" of vinyl aromatic compound having at least one vinyl substituent on an aromatic ring can mean that the composition according to the present disclosure and/or useful for practicing the present disclosure can include up to 2, 1, 0.5, 0.25, or 0.1 percent by weight of the vinyl aromatic compound. The composition according to the present disclosure and/or useful for practicing the present disclosure can be free of a vinyl aromatic compound having at least one vinyl substituent on an aromatic ring.

In some embodiments, the composition of the present disclosure and/or useful in the method of the present disclosure comprise a reactive diluent having at least one carbon-carbon double bond other than a vinyl substituent on an aromatic ring. In some embodiments, the reactive diluent comprises at least one of acrylate groups, methacrylate groups, allyl ether groups, or vinyl ether groups.

In some embodiments, the reactive diluent that is useful in combination with the vinyl ester represented by formula R—[C(O)—O—CH═CH$_2$]$_n$, as described above in any of its embodiments, includes at least one of acrylate groups or methacrylate groups. Examples of useful acrylates and methacrylates include methyl (meth)acrylate, ethyl (meth) acrylate, isopropyl (meth)acrylate, n-butyl (meth)acrylate, isobutyl (meth)acrylate, 2-ethylhexyl (meth)acrylate, lauryl (meth)acrylate, ethylene glycol dicyclopentenyl ether (meth)acrylate, and propanediol dicyclopentenyl ether (meth)acrylate. Hydroxy-functionalized (meth)acrylates that can be used in the composition of the present disclosure include hydroxyethyl methacrylate, hydroxypropyl methacrylate, hydroxyethyl acrylate, and hydroxypropyl acrylate. Multifunctional (meth)acrylate useful in the composition of the present disclosure include 1,4-butanediol diacrylate, 1,6-hexanediol diacrylate, diethylene glycol diacrylate, 1,3-butylene glycol diacrylate, neopentyl glycol diacrylate, cyclohexane dimethanol diacrylate, dipropylene glycoldiacrylate, ethoxylated bisphenol A diacrylate, trimethylolpropane triacrylate, pentaerythritol triacrylate, pentaerythritol tetraacrylate and their related (meth)acrylate derivatives. In some embodiments, the multi-functional acrylate or methacrylate comprises at least one of bis-acrylic acid or methacrylic acid esters of ethylene glycol, 1,4-butanediol and 1,6-hexanediol; tris-acrylic acid or methacrylic acid esters of glycerol, trimethylolpropane and pentaerythritol; tetrakis-acrylic acid or methacrylic acid esters of pentaerythritol; or alkoxylation of products of any of these and at least one of propylene oxide or ethylene oxide.

Urethane acrylates and methacrylates may also be useful for practicing the present disclosure. Urethane acrylates and methacrylates are typically products of difunctional or multifunctional isocyanate with a hydroxy-functionalized acrylate or methacrylate. The isocyanates may be isocyanate-terminal polyurethanes prepared from hydrocarbon, polyether, or polyester alcohols.

Some acrylates and methacrylates useful for practicing the present disclosure are commercially available including, for example, from Sartomer, Exton, Penn., a subsidiary of Arkema, under the trade designations "SR350", "SR351H", "SR205", "SR206", "SR248", "CN991", and "CN9006".

The composition of the present disclosure and/or useful for practicing the present disclosure can have at least 1, 2.5, 5, or at least 10 percent by weight of any of the acrylates or methacrylates described above or combination thereof. In some embodiments, the composition according to the present disclosure and/or useful for practicing the present disclosure can include up to 25 or 20 percent by weight of any acrylate or methacrylate. These percentages are based on the total weight of the composition including the unsaturated polyester resin, the vinyl ester, the tertiary amine, and the inorganic filler.

In some embodiments, the composition according to the present disclosure and/or useful for practicing the present disclosure can include up to 10, 5, 4, 3, 2, 1, 0.5, 0.25, or 0.1 percent by weight of ethylene glycol dicyclopentenyl ether (meth)acrylate and propanediol dicyclopentenyl ether (meth)acrylate or can be free of ethylene glycol dicyclopentenyl ether (meth)acrylate and propanediol dicyclopentenyl ether (meth)acrylate. In some embodiments, the composition according to the present disclosure and/or useful for practicing the present disclosure can include up to 10, 5, 4, 3, 2, 1, 0.5, 0.25, or 0.1 percent by weight lauryl (meth) acrylate or can be free of lauryl (meth)acrylate. These percentages are based on the total weight of the composition including the unsaturated polyester resin, the vinyl ester, the tertiary amine, and the inorganic filler.

Reactive diluents useful in compositions of the present disclosure also include vinyl ethers such as ethyl vinyl ether, n-propyl vinyl ether, iso-propyl vinyl ether, n-butyl vinyl ether, iso-butyl vinyl ether, cyclohexyl vinyl ether, hydroxybutyl vinyl ether, cyclohexanedimethanol divinyl ether, triethyleneglycol divinyl ether, butanediol divinyl ether, cyclohexanedimethanol monovinyl ether, diethyleneglycol divinyl ether, 2-ethylhexyl vinyl ether, dodecyl vinyl ether, octadecyl vinyl ether, hexanediol divinyl ether, dipropyleneglycol divinyl ether, and tripropyleneglycol divinyl ether. The composition of the present disclosure and/or useful for practicing the present disclosure can have at least 1, 2.5, or 5 percent by weight of any of these vinyl ethers or combination thereof. In some embodiments, the composition according to the present disclosure and/or useful for practicing the present disclosure can include up to 20, 10, 5, 4, 3, 2, 1, 0.5, 0.25, or 0.1 percent by weight of triethylene glycol divinyl ether or can be free of triethylene glycol divinyl ether. In some embodiments, the composition according to the present disclosure and/or useful for practicing the present disclosure can include up to 20, 10, 5, 4, 3, 2, 1, 0.5, 0.25, or 0.1 percent by weight of any vinyl ether or can be free of vinyl ethers. These percentages are based on the total weight of the composition including the unsaturated polyester resin, the vinyl ester, the tertiary amine, and the inorganic filler.

In some embodiments, the composition according to and/or useful for practicing the method of the present disclosure includes a tertiary amine, which is useful for accelerating the free-radical curing of the composition at room temperature. Useful tertiary amines include N,N-dialkyl toluidines, where each alkyl group is optionally substituted by hydroxyl and independently selected from among methyl, ethyl, hydroxyethyl, hydroxylpropyl, isopropyl and mixtures thereof); trialkyl amines, where each alkyl is optionally substituted by hydroxyl and independently selected from among ethyl, propyl, and hydroxyethyl; N,N-dialkylanilines (e.g., N,N-dimethylaniline and N,N-diethylaniline); 4,4-bis(dimethylamino) diphenylmethane; and mixtures of any of these. In some embodiments, the accelerator is N,N-diisopropanol-p-toluidine, N,N-dihydroxyethyl-p-toluidine; N,N-methylhydroxyethyl-p-toluidine, or a mixture of these. The tertiary amine is generally present in a catalytic (that is, sub-stoichiometric) amount in the composition. Any useful amount of tertiary amine may be included in the composition. In some embodiments, a tertiary amine is included in the composition in an amount of at at least 0.01, 0.05, or 0.1 percent by weight, based on the total weight of the composition including the unsaturated polyester resin, the vinyl ester, the tertiary amine, and the inorganic filler. In some embodiments, a tertiary amine is included in the composition in an amount up to 2, 1, 0.75, or 0.5 percent by weight, based on the total weight of the composition including the unsaturated polyester resin, the vinyl ester, the tertiary amine, and the inorganic filler.

The composition according to the present disclosure and/or useful for practicing the method of the present disclosure also includes inorganic filler. In some embodiments, the composition according to the present disclosure includes at least one of ceramic beads, polymer beads, silica, hollow ceramic elements, hollow polymeric elements, alumina, zirconia, mica, dolomite, wollastonite, fibers, talc, calcium carbonate, sodium metaborate, or clay. Such fillers, alone or in combination, can be present in the composition according to the present disclosure in a range from 10 percent by weight to 70 percent by weight, in some embodiments, 20 percent by weight to 60 percent by weight or 40 percent by weight to 60 percent by weight, based on the total weight of the composition including the polymer resin, acrylate or methacrylate, and vinyl ester. Silica, alumina, and zirconia, for example, can be of any desired size, including particles having an average size above 1 micrometer, between 100 nanometers and 1 micrometer, and below 100 nanometers. Silica can include nanosilica and amorphous fumed silica, for example. The term "ceramic" refers to glasses, crystalline ceramics, glass-ceramics, and combinations thereof. Hollow ceramic elements can include hollow spheres and spheroids. Examples of commercially available materials suitable for use as the hollow, ceramic elements include glass bubbles marketed by 3M Company, Saint Paul, Minnesota, as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, IL under the trade designation "SIL-CELL" (e.g., grades SIL 35/34, SIL-32, SIL-42, and SIL-43). The hollow, ceramic elements may also be made from ceramics such as alpha-alumina, zirconia, and alumina silicates. In some embodiments, the hollow, ceramic elements are aluminosilicate microspheres extracted from pulverized fuel ash collected from coal-fired power stations (i.e., cenospheres). Useful cenospheres include those marketed by Sphere One, Inc., Chattanooga, TN, under the trade designation "EXTENDOSPHERES HOLLOW SPHERES" (e.g., grades SG, MG, CG, TG, HA, SLG, SL-150, 300/600, 350 and FM-1). Other useful hollow, ceramic spheroids include silica-alumina ceramic hollow spheres with thick walls marketed by Valentine Chemicals of Lockport, Louisiana, as ZEEOSPHERES CERAMIC MICROSPHERES in grades N-200, N-200PC, N-400, N-600, N-800, N1000, and N1200. The hollow ceramic elements may have one of a variety of useful sizes but typically has a maximum dimension, or average diameter, of less than 10 millimeters (mm), more typically less than one mm. In some embodiments, the hollow ceramic elements have a maximum dimension in a range from 0.1 micrometer to one mm, from one micrometer to 500 micrometers, from one micrometer to 300 micrometers, or even from one micrometer to 100 micrometers. The mean particle size of the hollow, ceramic elements may be, for example, in a range from 5 to 250 micrometers (in some embodiments from 10 to 110 micrometers, from 10 to 70 micrometers, or even from 20 to 40 micrometers). As used herein, the term size is considered to be equivalent with the diameter and height, for example, of glass bubbles. In some embodiments, each of the fillers in the composition according to the present disclosure has a mean particle size up to 100 micrometers as described in U.S. Pat. No. 8,034,852 (Janssen et al.). Compositions according to the present disclosure can also include dyes, pigments, rheology modifiers (e.g., fumed silica or clay).

In some embodiments, the inorganic filler is non-fibrous. Non-fibrous fillers typically have aspect ratios of their longest dimension to their shortest dimension of less than 10:1, 5:1, 4:1, 3:1, or 2:1. In some embodiments, the composition according to the present disclosure includes at least one of ceramic beads, polymer beads, silica, hollow ceramic microspheres, hollow polymeric microspheres, alumina, zirconia, mica, dolomite, wollastonite, talc, calcium carbonate, sodium metaborate, or clay.

In some embodiments, the composition according to the present disclosure and/or useful for practicing the method of the present disclosure further comprises one or more reactive compounds having at least one of a mercaptan, epoxy, or primary amino group. Such compounds may be useful as adhesion promoters, for example, for improving adhesion to metal surfaces.

Useful reactive compounds having one or more mercaptan groups include "POLYTHIOL QE-340M" curing agent from Toray Fine Chemicals, Co., Ltd., Tokyo, Japan, and a mercaptan terminated liquid resin, obtained under the trade designation "GABEPRO GPM-800" (a polyoxyalkylenetriol with mercapto end groups of the structure $R^3[O(C_3H_6O)_nCH_2CH(OH)CH_2SH]_3$ wherein $R^3$ represents an aliphatic hydrocarbon group having 1-12 carbon atoms and n is an integer from 1 to 25) from Gabriel Performance Products, Akron, Ohio.

In some embodiments, the composition according to the present disclosure and/or useful for practicing the present disclosure includes an amino- or mercapto-substituted compound represented by formula $(HD)_{1-4}$-R. In this formula, each D is independently —S— or —N(H)—. In some embodiments, D is —N(H)—, and the compound represented by formula $(HD)_{1-4}$-R has at least one amino group. In some embodiments, when more than one DH group is present each one is either —S— or —N(H)—. In formula $(HD)_{1-4}$-R, R is a monovalent alkyl, alkenyl, or polyalkyleneoxy or a multivalent alkylene, alkenylene, or polyalkyleneoxy that is interrupted by at least two ether (i.e., —O—), amine (i.e., —N(H)—), amide (i.e., —N(H)—C(O)—), thioester (i.e., —S—C(O)—), or ester (i.e., —O—C(O)—) groups or a combination thereof. In some embodiments, R is alkenylene that is interrupted by at least one amine (i.e., —N(H)—) and at least one amide (i.e., —N(H)—C(O)—). In some embodiments, R is polyalkyleneoxy with a molecular weight up to 2500, 2000, 1500, 1000, or 500. In the polyalkyleneoxy, the alkylene groups comprise at least one of ethylene or propylene groups.

In some embodiments, the amino- or mercapto-substituted compound represented by formula $(HD)_{1-4}$-R is represented by formula HD-$R^1$-Q-$R^2$, wherein $R^1$ is alkylene that is interrupted by at least one —N(H)— or —O—; Q is —N(H)—C(O)—, —S—C(O)—, or —O—C(O)—; and $R^2$ is alkyl or alkenyl. In some of these embodiments, Q is —N(H)—C(O)— or —O—C(O)—. In some embodiments, Q is a —N(H)—C(O)—. In some embodiments, $R^2$ is alkyl or alkenyl having from 8 to 14, 8 to 13, or 8 to 12 carbon atoms. Compounds of formula HD-$R^1$-Q-$R^2$ can be made, for example, by reaction of a diamine or dithiol with a saturated or unsaturated fatty acid. Diamines and dithiols useful for making these compounds include polyethylenepolyamines (e.g., diethylenetriamine, triethylenetetramine, or tetraethylenepentamine) and polyether diamines with a molecular weight up to 2500, 2000, 1500, 1000, or 500, $HSCH_2CH_2OCH_2CH_2OCH_2CH_2SH$, pentaerythritol tetra (3-mercaptopropionate), trimethylolpropane tris(3-mercaptoproionate), and ethylene glycol bis (3-mercaptopropionate). Useful polyether amines are commercially available, for example, under the trade designation "JEFFAMINE" from Huntsman Chemical, The Woodlands, Texas, and from BASF, Florham Park, New Jersey. The molecular weights are typically provided by the manufacturer.

Useful compounds of formula HD-$R^1$-Q-$R^2$ include compounds in which D is —N(H)—, $R^1$ is alkylene that is interrupted by at least one —N(H)—, Q is —N(H)—C(O)—, and $R^2$ is alkenyl having 8 to 14 carbon atoms. In some embodiments, the compound represented by formula HD-$R^1$-Q-$R^2$ is $H_2N(CH_2CH_2NH)_4C(O)(CH_2)_7C(H){=}C(H){-}(CH_2)_3CH_3$.

In some embodiments, the one or more reactive compounds useful in the composition and method of the present disclosure includes at least one epoxy group. Such compounds include epoxy resins. Epoxy resins useful in the compositions disclosed herein can include aromatic epoxy resins. Examples of aromatic epoxy resins useful in the compositions disclosed herein include novolac epoxy resins (e.g., phenol novolacs, ortho-, meta-, or para-cresol novolacs or combinations thereof), bisphenol epoxy resins (e.g., bisphenol A, bisphenol F, halogenated bisphenol epoxies, and combinations thereof), resorcinol epoxy resins, and tetrakis phenylolethane epoxy resins. In some embodiments, bisphenol epoxy resins, for example, may be chain extended to have any desirable epoxy equivalent weight. In some embodiments, the aromatic epoxy resin (e.g., either a bisphenol epoxy resin or a novolac epoxy resin) may have an epoxy equivalent weight of at least 140, 150, 200, 250, 300, 350, 400, 450, or 500 grams per mole. In some embodiments, the aromatic epoxy resin may have an epoxy equivalent weight of up to 2500, 3000, 3500, 4000, 4500, 5000, 5500, or 6000 grams per mole. In some embodiments, the aromatic epoxy resin may have an epoxy equivalent weight in a range from 150 to 6000, 200 to 6000, 200 to 5000, 200 to 4000, 250 to 5000, 250 to 4000, 300 to 6000, 300 to 5000, or 300 to 3000 grams per mole. Useful epoxy resins are available from a variety of commercial sources, for example, Hexion, Inc., Stafford, Tex.

In some embodiments, the one or more reactive compounds having at least one of a mercaptan, amino, or epoxy group is present in an amount in a range from 0.05 weight percent to about 10 weight percent (in some embodiments, 0.1 weight percent to 8 weight percent, or 0.5 weight percent to 5 weight percent), based on the total weight of the composition including the unsaturated polyester resin, the vinyl ester, the tertiary amine, and the inorganic filler.

In some embodiments, the composition of the present disclosure and/or useful for practicing the method of the present disclosure includes a transition metal or post-transition metal salt of a carboxylic acid. The carboxylic acid can be saturated or unsaturated, can include from 2 to 30, 2 to 10, 3 to 10, or 8 to 22 carbon atoms, can be monofunctional or multifunctional, and can have one or more hydroxyl substituents. In some embodiments, the carboxylic acid useful for providing the metal salt is represented by formula $R^1COOH$, wherein $R^1$ is alkyl or alkenyl. In some embodiments, the carboxylic acid is acetic acid, propionate acid, or lactic acid. The common names of the fatty acids having from eight to twenty-six carbon atoms are caprylic acid ($C_8$), capric acid ($C_{10}$), lauric acid ($C_{12}$), myristic acid ($C_{14}$), palmitic acid ($C_{16}$), stearic acid ($C_{18}$), arachidic acid ($C_{20}$), behenic acid ($C_{22}$), lignoceric acid ($C_{24}$), and cerotic acid ($C_{26}$). Metal salts of these acids may be caprylate, caprate, laurate, myristate, palmitate, stearate, arachidate, behenate, lignocerate, and cerotate salts, in some embodiments. The salt can also be a naphthenate or a salt of linseed oil fatty acid. The transition metal is typically in the +2 oxidation state. Useful transition and post-transition metals for the metal salt include cobalt (II), copper (II), manganese (II), lead (II), tin (II), zinc (II), and iron (II). In some embodiments, the metal is a transition metal comprising at least one of copper, cobalt, or iron. In some embodiments, the metal salt of a carboxylic acid comprises at least one of cobalt (II) 2-ethylhexanoate, iron (II) naphthenate, iron (II) lactate hydrate, or cobalt (II) naphthenate. In some embodiments, the metal salt of a carboxylic acid comprises at least one of cobalt (II) 2-ethylhexanoate or cobalt (II) naphthenate. The metal salts are commercially available from a variety of chemical suppliers or can be prepared by known methods.

The composition of the present disclosure and/or useful for practicing the method of the present disclosure can have at least 0.05, 0.1, 0.5, or at least one percent by weight of any of the metal salts of carboxylic acids described above or combination thereof. In some embodiments, the composition according to the present disclosure and/or useful for practicing the present disclosure can include up to 5, 2.5, or 2 percent by weight of any metal salt of a carboxylic acid. These percentages are based on the total weight of the composition including the unsaturated polyester resin, the vinyl ester, the tertiary amine, and the inorganic filler.

In some embodiments, the composition according to and/or useful for practicing the present disclosure includes a wax, which may be useful, for example, for reducing tackiness at the surface as the composition cures. Useful waxes include a wide variety of paraffins. Examples of useful waxes include those from Frank B. Ross Co., Rahway, N.J. In some embodiments, the wax is present in an amount in a range from 0.05 weight percent to about 2 weight percent (in some embodiments, 0.05 weight percent to 1 weight percent, or 0.1 weight percent to 0.5 weight percent), based on the total weight of the composition including the unsaturated polyester resin, the vinyl ester, the tertiary amine, and the inorganic filler.

The composition according to the present disclosure and/or useful for practicing the method of the present disclosure can include one or more radical inhibitors. Examples of useful classes of radical inhibitors include phenolic compounds, stable radicals like galvinoxyl and N-oxyl based compounds, catechols, and phenothiazines Examples of useful radical inhibitors that can be used in composition according to the present disclosure include 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, naphthoquinone, 1-oxyl-2,2,6,6-tetramethylpiperidine, 1-oxyl-2,2,6,6-tetramethylpiperidine-4-ol, 1-oxyl-2,2,6,6-tetramethylpiperidine-4-one, 1-oxyl-2,2,6,6-tetramethyl-4-carboxyl-piperidine, 1-oxyl-2,2,5,5-tetramethylpyrrolidine, 1-oxyl-2,2,5,5-tetramethyl-3-carboxylpyrrolidine, aluminium-N-nitrosophenyl hydroxylamine, die thylhydroxylamine, phenothiazine and/or derivatives or combinations of any of these compounds. Any useful amount of radical inhibitor may be included in the composition disclosed herein. In some embodiments, the amount of radical inhibitor in the composition is in the range of from 0.0001% to 10% (in some embodiments, 0.001% to 1%) by weight, based on the total weight of the composition including the unsaturated polyester resin, the vinyl ester, the tertiary amine, and the inorganic filler.

Compositions according to the present disclosure can be packaged, for example, as a two-part composition (e.g., body repair composition), wherein a first part comprises the composition including any of the components described above, and a second part comprises a free-radical initiator (e.g., organic peroxide or organic hydroperoxide).

Examples of useful organic peroxides and hydroperoxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), and diacylperoxides (e.g., benzoyl peroxide or lauryl peroxide). Other examples of useful organic peroxides include peroxycarbonates (e.g., tert-butylperoxy 2-ethylhexylcarbonate, tert-butylperoxy isopropyl carbonate, or di(4-tert-butylcyclohexyl) peroxydicarbonate) and ketone peroxides (e.g., methyl ethyl ketone peroxide, 1,1-di(tert-butylperoxy) cyclohexane, 1,1-di(tert-butylperoxy)-3,3,5-trimethylcyclohexane, and cyclohexanone peroxide). The organic peroxide may be selected, for example, based on the temperature desired for use of the organic peroxide and compatibility with the polymeric resin desired to be cured. For curing at room temperature, benzoyl peroxide, cumene hydroperoxide, cyclohexanone peroxide, diisopropylbenzene dihydroperoxide, t-butyl monoperoxymaleate, lauryl peroxide, methyl ethyl ketone peroxide, t-butyl hydroperoxide, or mixtures thereof may be useful. Any useful amount of organic peroxide and/or hydroperoxide may be combined with the composition. In some embodiments, at least one of a peroxide or hydroperoxide is combined with the composition in an amount up to 3, 2.5, 2, or 1.5 percent by weight, based on the total weight of the composition including the unsaturated polyester resin, the vinyl ester, the tertiary amine, and the inorganic filler.

For convenience, when adding organic peroxides and hydroperoxides to a composition according to the present disclosure, the peroxide may be used in a formulation (e.g., paste) that also includes a diluent. The diluent can be a plasticizer, mineral spirits, water, or solvent (e.g., N-methyl-2-pyrrolidone, tetrahydrofuran, or ethyl acetate). For example, pastes made from benzoyl peroxide, ketone peroxides (e.g., methyl ethyl ketone peroxide), hydroperoxides (e.g., cumene hydroperoxide), peroxyesters (e.g., t-butyl peroxy-2-ethylhexanoate), and diperoxyketals are all sold commercially.

In a two-part composition in which the second part includes a free-radical initiator (e.g., organic peroxide or organic hydroperoxide) in a diluent, the volumetric ratio of the first to second part may be in the range of, e.g., 20:1 or higher, or 25:1 or higher, or 30:1 or higher (e.g., 50:1). Organic peroxide and organic hydroxide pastes often have a relatively high concentration (e.g., about 50% by weight), and high ratios of the first part to the second part ensure that the amount of organic peroxide or hydroperoxide is low enough so that it can be applied (e.g., as a body filler) without hardening too quickly. However, two-part composition is often packaged in a cartridge system, and mixing compositions from a cartridge at ratios of 20:1, 25:1, 30:1, or higher can result in non-uniform mixing (e.g., using a static mixer). Also, a 50:1 by volume cartridge packaging system is typically expensive. Lowering the concentration of the second part with diluent for use in a cartridge system having two cartridges more equivalent in volume can result in undesired plasticization of the composition.

We have found that the composition of the present disclosure can be packaged, for example, as a two-part composition (e.g., body repair composition), wherein a first part comprises the composition including any of the components described above, and a second part comprises a free-radical initiator (e.g., organic peroxide or organic hydroperoxide) and at least a portion of at least one of a vinyl ester represented by formula R—[C(O)—O—CH═$CH_2$]$_n$, a reactive diluent comprising at least one of acrylate groups, methacrylate groups, allyl ether groups, or vinyl ether groups, or a reactive compound having at least one of a mercaptan, epoxy, or primary amino group. The second part may also include inorganic filler. In some embodiments, the first part can include at least one of a dicyclopentadiene-modified unsaturated polyester resin or an ethylene glycol fumarate unsaturated polyester resin, a tertiary amine; and inorganic filler, and the second part can include the organic peroxide or organic hydroperoxide, the vinyl ester represented by formula R—[C(O)—O—CH═$CH_2$]$_n$ wherein R is alkyl, aryl, or a combination thereof, and n is 1 or 2, any other reactive diluents and reactive compounds described above, and inorganic filler. In some embodiments, the first part can include at least one of a dicyclopentadiene-modified unsaturated polyester resin or an ethylene glycol fumarate unsaturated polyester resin; the vinyl ester represented by formula R—[C(O)—O—CH═$CH_2$]$_n$ wherein R is alkyl, aryl, or a combination thereof, and n is 1 or 2; any other reactive diluents and/or reactive compounds described above; a tertiary amine; and inorganic filler, and the second part can include the organic peroxide or organic hydroperoxide, the vinyl ester represented by formula R—[C(O)—O—CH═$CH_2$]$_n$ wherein R is alkyl, aryl, or a combination thereof, and n is 1 or 2, any other reactive diluents and reactive compounds described above, and inorganic filler. In a two-part composition in which the second part includes at least a portion of the components of the composition of the present disclosure (e.g., the vinyl ester, any other reactive diluents and reactive compounds described above, and inorganic filler), a lower ratio of the first part to the second part may be useful. In such a two-part composition, the volumetric ratio of the first to second part may be, e.g., 10:1 or lower, 5:1 or lower, 2:1, or even 1:1. As shown in Example 19, below, when a composition of the present disclosure was prepared from a two-part composition in which the second part included benzoyl peroxide at three percent by weight, and the weight ratio of the first part to the second part was 2:1, the composition had the same performance Example 17, which included the same components, but the 50% benzoyl peroxide paste was mixed in at the end after the rest of the components in the composition were mixed.

The present disclosure provides a method of repairing a damaged surface. The method includes combining the composition described above in any of its embodiments with an organic peroxide or hydroperoxide, applying the composition comprising the organic peroxide or hydroperoxide to the damaged surface; and curing the composition on the damaged surface. In some embodiments, curing is carried out at room temperature. Advantageously, since the composition can be carried out at room temperature, it can be cured without being subjected to a source of heat or radiation (e.g., light).

The present disclosure provides a cured composition made from the curable composition according to any of the above embodiments as well as an article comprising the cured composition on a surface.

One application of compositions according to the present disclosure are curable body repair materials useful in the repair of damaged vehicles and other equipment (e.g., cars, trucks, watercraft, windmill blades, aircraft, recreational vehicles, bathtubs, storage containers, and pipelines). Curable body repair materials can include two reactive components (e.g., a curable polymeric resin and catalyst or initiator) which are mixed together to form the curable body repair material.

In some embodiments of the method of the present disclosure, the damaged surface to be repaired is on at least a portion of a vehicle. Similarly, in some embodiments of the article of the present disclosure, the article is a portion of a vehicle.

The process of repairing dents and other damage using body repair materials can present challenges. For repairing an automobile, for example, a technician typically mixes the two reactive components and then uses a squeegee to spread the repair compound onto the surface of the vehicle to roughly match the contour of the surface. As the curable polymeric resin reacts with the curative or initiator, it hardens to a state where it can be shaped to match the contour of the vehicle before it was damaged. During this hardening process, the repair compound typically transitions from a state of soft, gelled material to a state of moderately hard material that is relatively easy to shape with an abrasive article (e.g., sandpaper) to a state of hard material. Body repair materials typically require handling in a relatively narrow time window. Premature sanding of body repair material before it has reached a critical amount of cure results in sandpaper becoming plugged reducing its effectiveness, the surface of the body repair material becoming rough, and sometimes the body repair material peeling away from the surface of the vehicle. If this situation occurs, then typically the body repair material has to be partially removed (usually by sanding) such that another layer of body repair material can be put on top and properly shaped. Furthermore, it is challenging for body repair materials to adhere well to a variety of common repair surfaces (e.g., aluminum, galvanized steel, E-coats, primers, and paints).

When used as a body filler, the composition of the present disclosure can further provide a viscosity suitable for spreading, suitable surface tackiness and sanding after 20 minutes, and suitable adhesion to metal and scratch resistance as determined using the evaluation methods described in the Examples below. As shown in the Examples, below, when the vinyl ester represented by formula R—[C(O)—O—CH═$CH_2$]$_n$ is combined with at least one of a dicyclopentadiene-modified unsaturated polyester resin or an ethylene glycol fumarate unsaturated polyester resin, better curing and sanding were observed in comparison to when the vinyl ester was combined with a different unsaturated polyester resin. See, for example, a comparison of Examples 1 and 13 with Comparative Examples A and B. Also, as shown in the examples, the vinyl ester represented by formula R—[C(O)—O—CH═$CH_2$]$_n$, can provide better curing in a body filler formulation than other reactive diluents such as certain vinyl ethers as determined by the observation of surface curing and tack and sandability. See, for example, Example 1 versus Comparative Example E. Further as shown in the Examples, below, the vinyl ester represented by formula R—[C(O)—O—CH═$CH_2$]$_n$, can be combined with other reactive diluents such as vinyl ethers and acrylates or methacrylates to provide curing, adhesion, and sanding properties useful for body fillers. The combination of a vinyl ester with acrylates or methacrylates can advantageously provide better curing, adhesion, and sanding properties than acrylates or methacrylates on their own or acrylates or methacrylates in combination with certain vinyl ethers. See, for example, Example 6 vs. Comparative Example C, D, or G.

Some Embodiments of the Disclosure

In a first embodiment, the present disclosure provides a composition comprising:

at least one of a dicyclopentadiene-modified unsaturated polyester resin or an ethylene glycol fumarate unsaturated polyester resin;

a vinyl ester represented by formula R—[C(O)—O—CH═$CH_2$]$_n$ wherein R is alkyl, aryl, or a combination thereof, and n is 1 or 2;

a tertiary amine; and inorganic filler.

In a second embodiment, the present disclosure provides the composition of the first embodiment, wherein the composition is substantially free of a vinyl aromatic compound having at least one vinyl substituent on an aromatic ring.

In a third embodiment, the present disclosure provides the composition of the first or second embodiment, wherein the composition comprises the dicyclopentadiene-modified unsaturated polyester resin.

In a fourth embodiment, the present disclosure provides the composition of the third embodiment, wherein the dicyclopentadiene-modified unsaturated polyester resin comprises a dicyclopentenyl-end-capped unsaturated polyester resin.

In a fifth embodiment, the present disclosure provides the composition of any one of the first to fourth embodiments, wherein the dicyclopentadiene-modified unsaturated polyester resin is substantially free of allyl ether groups.

In a sixth embodiment, the present disclosure provides the composition of any one of the first to fifth embodiments, wherein the composition comprises the ethylene glycol fumarate unsaturated polyester resin, which comprises at least a portion represented by formula —$(OCH_2CH_2)_p$—O—[C(O)—CH═CH—C(O)—$(OCH_2CH_2)_p$—O]$_m$—, wherein the double bond is a trans double bond, and wherein m is from 1 to 100 and p is in a range from 1 to 10.

In a seventh embodiment, the present disclosure provides the composition of any one of the first to sixth embodiments, further comprising another unsaturated polyester resin comprising an internal olefin. (This unsaturated polyester resin is in addition to the dicyclopentadiene-modified unsaturated polyester resin and the ethylene glycol fumarate unsaturated polyester resin).

In an eighth embodiment, the present disclosure provides the composition of any one of the first to seventh embodiments, further comprising an epoxy vinyl ester resin.

In a ninth embodiment, the present disclosure provides the composition of the eighth embodiment, wherein the vinyl ester is represented by formula R—C(O)—O—CH═$CH_2$, wherein R is alkyl.

In a tenth embodiment, the present disclosure provides the composition of the ninth embodiment, wherein R has more than one carbon atom.

In an eleventh embodiment, the present disclosure provides the composition of the ninth or tenth embodiment, wherein R is alkyl having up to four carbon atoms.

In a twelfth embodiment, the present disclosure provides the composition of the ninth or tenth embodiment, wherein R is branched alkyl having 3 to 12, 4 to 10, or 9 to 10 carbon atoms.

In a thirteenth embodiment, the present disclosure provides the composition of any one of the first to twelfth embodiments, wherein the vinyl ester comprises at least one of vinyl acetate, vinyl propionate, vinyl pivalate, or vinyl neodecanoate or wherein the vinyl ester comprises at least one of vinyl propionate, vinyl pivalate, or vinyl neodecanoate.

In a fourteenth embodiment, the present disclosure provides the composition of any one of the first to thirteenth embodiments, wherein the vinyl ester is present in an amount of more than five percent by weight, or at least ten percent by weight, based on the total weight of the composition.

In a fifteenth embodiment, the present disclosure provides the composition of any one of the first to fourteenth embodiments, further comprising a reactive diluent having at least one carbon-carbon double bond other than a vinyl substituent on an aromatic ring.

In a sixteenth embodiment, the present disclosure provides the composition of the fifteenth embodiment, wherein the reactive diluent comprises at least one of acrylate groups, methacrylate groups, allyl ether groups, or vinyl ether groups.

In a seventeenth embodiment, the present disclosure provides the composition of the sixteenth embodiment, wherein the reactive diluent comprises at least one of acrylate or methacrylate groups, and wherein the reactive diluent comprises at least one of a bis-acrylic acid or methacrylic acid ester of ethylene glycol, 1,4-butanediol and 1,6-hexanediol; tris-acrylic acid or methacrylic acid esters of glycerol, trimethylolpropane and pentaerythritol; tetrakis-acrylic acid or methacrylic acid esters of pentaerythritol; or alkoxylation of products of any of these and at least one of propylene oxide or ethylene oxide.

In an eighteenth embodiment, the present disclosure provides the composition of the sixteenth embodiment, wherein the composition comprises vinyl ether groups (e.g., diethylene glycol divinyl ether or triethylene glycol divinyl ether).

In a nineteenth embodiment, the present disclosure provides the composition of any one of the first to seventeenth embodiments, wherein the composition is free of vinyl ethers.

In a twentieth embodiment, the present disclosure provides the composition of any one of the first to nineteenth embodiments, wherein the composition is free of ethylene glycol dicyclopentenyl ether (meth)acrylate and propanediol dicyclopentenyl ether (meth)acrylate.

In a twenty-first embodiment, the present disclosure provides the composition of any one of the first to twentieth embodiments, wherein the composition is free of lauryl (meth)acrylate.

In a twenty-second embodiment, the present disclosure provides the composition of any one of the first to twenty-first embodiments, wherein the polyester resin is not prepared from an alkoxylated 2-butene-1,4-diol.

In a twenty-third embodiment, the present disclosure provides the composition of any one of the first to twenty-second embodiments, wherein the inorganic filler comprises at least one of ceramic beads, polymer beads, silica, hollow ceramic elements, hollow polymeric elements, alumina, zirconia, mica, dolomite, wollastonite, fibers, talc, calcium carbonate, or clay.

In a twenty-fourth embodiment, the present disclosure provides the composition of any one of the first to twenty-second embodiments, wherein the inorganic filler is non-fibrous.

In a twenty-fifth embodiment, the present disclosure provides the composition of the twenty-fourth embodiment, wherein the inorganic filler comprises at least one of ceramic beads, polymer beads, silica, hollow ceramic microspheres, hollow polymeric microspheres, alumina, zirconia, mica, dolomite, wollastonite, talc, calcium carbonate, or clay.

In a twenty-sixth embodiment, the present disclosure provides the composition of any one of the first to twenty-fifth embodiments, wherein the tertiary amine comprises at least one N,N-dialkyl toluidine, where each alkyl group is independently methyl, ethyl, hydroxyethyl, hydroxylpropyl, or isopropyl.

In a twenty-seventh embodiment, the present disclosure provides the composition of any one of the first to twenty-sixth embodiments, further comprising a metal salt of the carboxylic acid.

In a twenty-eighth embodiment, the present disclosure provides the composition of the twenty-seventh embodiment, wherein the metal salt of the carboxylic acid is a 2+ transition metal or post-transition metal salt.

In a twenty-ninth embodiment, the present disclosure provides the composition of the twenty-eighth embodiment, wherein the metal salt comprises at least one of an iron (II) carboxylate, a copper (II) carboxylate, or a cobalt (II) carboxlyate.

In a thirtieth embodiment, the present disclosure provides the composition of any one of the twenty-seventh to twenty-ninth embodiments, wherein the metal salt of the carboxylic acid comprises at least one of cobalt (II) 2-ethylhexanoate or cobalt (II) naphthenate.

In a thirty-first embodiment, the present disclosure provides the composition of any one of the first to thirtieth embodiments, further comprising one or more reactive compounds having at least one of a mercaptan, epoxy, or primary amino group.

In a thirty-second embodiment, the present disclosure provides the composition of the thirty-first embodiment, wherein the one or more reactive compounds comprises at least one mercaptan group.

In a thirty-third embodiment, the present disclosure provides the composition of the thirty-first or thirty-second embodiment, wherein the one or more reactive compounds comprises at least one epoxy group.

In a thirty-fourth embodiment, the present disclosure provides the composition of the thirty-third embodiment, wherein at least one of the one or more reactive compounds is an epoxy resin.

In a thirty-fifth embodiment, the present disclosure provides the composition of any one of the thirty-first to thirty-fourth embodiments, wherein the one or more reactive compounds comprises a compound represented by formula $(HD)_{1-4}$-R, wherein each D is independently —S— or —N(H)— and R is a monovalent alkyl, alkenyl, or polyalkyleneoxy or a multivalent alkylene, alkenylene, or polyalkyleneoxy that is interrupted by at least two ether (i.e., —O—), amine (i.e., —N(H)—), amide (i.e., —N(H)—C(O)—), thioester (i.e., —S—C(O)—), or ester (i.e., —O—C(O)—) groups or a combination thereof.

In a thirty-sixth embodiment, the present disclosure provides the composition of the thirty-fifth embodiment, wherein the compound represented by formula $(HD)_{1-4}$-R is represented by formula HD-$R^1$-Q-$R^2$, wherein $R^1$ is alkylene that is interrupted by at least one —N(H)— or —O—; Q is —N(H)—C(O)—, —S—C(O)—, or —O—C(O)—; and $R^2$ is alkyl or alkenyl.

In a thirty-seventh embodiment, the present disclosure provides the composition of the thirty-fifth or thirty-sixth embodiment, wherein the compound is $H_2N(CH_2CH_2NH)_4C(O)(CH_2)_7C(H){=}C(H){-}(CH_2)_3CH_3$.

In a thirty-eighth embodiment, the present disclosure provides the composition of any one of the first to thirty-seventh embodiments, further comprising at least one of a surfactant, a free-radical inhibitor, or a wax.

In a thirty-ninth embodiment, the present disclosure provides the composition of any one of the first to thirty-eighth embodiments, wherein the composition is curable at room temperature.

In a fortieth embodiment, the present disclosure provides the composition of any one of the first to thirty-ninth embodiments, packaged as a two-part body repair composition, wherein a first part comprises the composition and a second part comprises a free-radical initiator.

In a forty-first embodiment, the present disclosure provides the composition of the fortieth embodiment, wherein the free-radical initiator comprises at least one of an organic peroxide or organic hydroperoxide.

In a forty-second embodiment, the present disclosure provides the composition of the fortieth or forty-first embodiment, wherein the second part further comprises at least one of a portion of the vinyl ester, the reactive diluent comprises at least one of acrylate groups, methacrylate groups, allyl ether groups, or vinyl ether groups, or one or more reactive compounds having at least one of a mercaptan, epoxy, or primary amino group.

In a forty-third embodiment, the present disclosure provides the composition of the forty-second embodiment, wherein the volume ratio of the first part to the second part is 10:1 or less.

In a forty-fourth embodiment, the present disclosure provides a method of repairing a damaged surface, the method comprising:

combining the composition of any one of the first to fortieth embodiments with at least one of an organic peroxide or organic hydroperoxide;

applying the composition comprising the organic peroxide or organic hydroperoxide to the damaged surface; and curing the composition on the damaged surface.

In a forty-fifth embodiment, the present disclosure provides the method of the forty-fourth embodiment, wherein the damaged surface is on at least a portion of a vehicle.

In a forty-sixth embodiment, the present disclosure provides the method of the forty-fourth or forty-fifth embodiment, wherein curing is carried out at room temperature.

In a forty-seventh embodiment, the present disclosure provides a cured composition prepared from the composition of any one of the first to forty-third embodiments or prepared by the method of any one of the forty-fourth to forty-sixth embodiments.

In a forty-eighth embodiment, the present disclosure provides an article prepared by curing the composition of any one of the first to forty-third embodiments or prepared by the method of any one of the forty-fourth to forty-sixth embodiments.

In order that this disclosure can be more fully understood, the following examples are set forth. It should be understood that these examples are for illustrative purposes only and are not to be construed as limiting this disclosure in any manner.

EXAMPLES

| Materials | |
|---|---|
| Abbreviation or Trade Name | Description |
| AC | An amide, obtained under the trade designation "AMERIBOND E-102" from Ameritech Corporation, Marietta, Georgia/ |
| AS | Amorphous silica, obtained under the trade designation "ZEOTHIX 265" from Huber Engineered Materials, Overland Park, Kansas. |
| BHP | A blue dyed, 50 wt. % benzoyl peroxide paste, obtained from Raichem, s.r.l., Reggio Emilia, Italy. |
| BNMA | Benzyl methacrylate, obtained from Evonik Cyro LLC, Piscataway, New Jersey. |
| CC | Calcium Carbonate, obtained under the trade designation "GAMACO" from IMERYS, Roswell, Georgia. |
| CBT | a cobalt salt of 2-ethylhexanoic acid, obtained under the trade designation "12% COBALT CATALYST 510" from Borchers Americas, Inc., Westlake, Ohio. |
| DBQ | Glass hollow microspheres, obtained under the trade designation "Q-CEL 6717" from Potters Industries, Inc, Valley Forge, Pennsylvania. |
| DCEA | Dicyclopentenyl methacrylate, obtained from Hitachi Chemical Co, San Jose, Califonia. |
| DcMo | Dicyclopentadiene monomer, obtained from Sigma-Aldrich Company, S. Louis, Missouri. |
| DMPT | N,N-Dimethyl-para-toluidine, obtained from Albemarle Corporation, Baton Rouge, Louisiana. |
| DVE-2 | Diethyleneglycoldivinyl ether, obtained under the trade designation "DVE-2" from BASF, Florham Park, New Jersey. |
| DVE-3 | Triethylene glycol divinyl ether, obtained under the trade designation "DVE-3" from BASF. |
| EP | An undiluted clear difunctional bisphenol A/epichloro-hydrin derived liquid epoxy resin, obtained under the trade designation "EPON RESIN 828" from Hexion, Inc., Stafford, Texas. |
| HEMA | 2-Hydroxyethyl methacrylate, obtained from Evonik Cyro LLC, Piscataway, New Jersey. |
| MTBHQ | Mono-Tert-Butylhydroquinone, obtained from Plasticolors, Inc., Ashtabula, Ohio |
| PMR | A Diethylene glycol/fumarate polyester resin, obtained from Polynt Composites, North Kansas City, Missouri. |
| PW | Paraffin wax, having a melting point of 125° F.-130° F., obtained under the trade designation "60-0254" from Frank B. Ross Co., Ins., Rahway, New Jersey. |
| S-22 | Glass bubbles, obtained under the trade designation "S-22" from 3M Company. St. Paul, Minnesota. |
| SDCP | A Dicyclopentadiene terminated polyester resin, obtained from Polynt Composites. |
| SH | A mercaptan terminated liquid resin, obtained under the trade designation "GABEPRO GPM-800" from, Gabrial Chem, Ashtabula, Ohio. |
| SUPR | A solid unsaturated Orthophthalic polyester resin, obtained from Polynt Composites. |
| Talc | Talc, obtained under the trade designation "GRADE AB" from Luzenac America, Inc., Centennial, Colorado. |
| TDEA | p-tolyl diethanolamine, obtained from BASF Corporation, Florham Park, New Jersey. |
| TMPTA | Trimethylolpropane triacrylate, obtained under the trade designation "SR351H" from Sartomer USA, LLC., Eaton, Pennsylvania. |
| VAM | Vinyl acetate, obtained from Alfa-Aesar, Ward Hill, Massachusetts. |
| VHR | A vinyl hybrid liquid resin obtained under the trade designation "D35065" from Reichhold LLC, Durham, North Carolina. |

-continued

| Materials | |
|---|---|
| Abbreviation or Trade Name | Description |
| VV9 | vinyl ester of VersaticTM Acid 9, obtained under the trade designation "VeoVa 9 MONOMER" from Hexion, Inc. Stafford, Texas. |

Panel Preparation and Test Methods

Panel Preparation:

For the formulations identified in Tables 1, 3, 5 and 7, curing occurs when a specific formulation is mixed with BHP hardener, which decomposed into free radicals to crosslink the composition. The weight ratio of the designated formulation to BHP is generally 50:1 (approx. 2% BHP by weight).

A 210 mm×100 mm steel panel was manually sanded with an 80 grit sandpaper to provide a rough surface. The surface was cleaned using acetone. 100 grams of a formulation was thoroughly mixed with 2 grams BHP at 21° C. and applied to the sanded steel panel. After 20 minutes of curing at room temperature, the cured sample was evaluated for its surface curing by measuring surface tackiness, easy of sanding, degree of clogging, featheredging, and scratching resistance. The results of the evaluations are listed in Table 2, 4, 6 and 8.

Surface Tackiness Test Method:

Surface tackiness is a measure of surface curing of the formulation and was determined by applying a fingertip to the surface of a cured formulation and monitoring for the presence of stickiness/tackiness. Tack Free is when the material surface does not feel sticky to the touch. A tack free surface was given a rating of "5" and a highly tacky surface were given a rating of "1" (surface not cured), with ratings ranging therebetween depending on the relative level of tackiness.

Sanding and Clogging Test Methods:

Sanding was performed using a sanding block with 80-grit sandpaper. The formulation bonded to the upper portion of the panel was manually sanded using a back and forth motion for twenty cycles. A rating of "5" was given if the cured formulation was easily ground into fine particles. Lower ratings, down to a "1" rating, were given if the sanding was not as easy, due to surface tack for example, and/or fine particles did not form upon sanding. Clogging was evaluated after the sanding process by observing the sandpaper for any filling with sanding residue from the cured formulation. A "5" rating was given if there was no coverage of the 80-grit sandpaper by sanding residue of the formulation. Lower ratings, down to a "1" rating, were given if the sanding residue filled at least a portion of the surface of the 80-grit sandpaper, with a "1" rating indicating complete coverage of the sandpaper with sanding residue.

Feather Edge Test Method:

After curing the formulation on the panel for 20 minutes, the formulation on the lower portion of the panel was abraded with 80 grit sand paper and feathered along the edge of the layer in an attempt to get a fine feathered edge. If a feathered edge was achieved, the formulation was designated as "Yes" in Tables 2,4,6 and 8, below. If not, the formulation usually exhibited roll back, and is designated as such in the tables. Roll back relates to a feathered edge that is not smooth, having a ridge at the edge and, in some case, material may have chipped off from the feathered edge during the sanding process.

Scratch Resistance Test Method:

Scratching resistance was determined at the featheredge line after sanding by attempting to scratch the featheredge line with a fingernail, if featheredging is obtainable. This is a measure of adhesion between applied material and panel. A "5" rating was given if the formulation was very difficult to scratch a "1" rating was given if the formulation easily scratched or chipped off the panel, with rating ranging therebetween depending on the relative level of scratch resistance.

Formulation Preparation

Formulations (i.e. examples, designated as EX, and comparative examples, designated as CE) were prepared using a high-speed mixer, a model "DAC 600 SPEED MIXER", available from Flak Tek Inc., Landrum, South Carolina, according to the formulations listed in Table 1, 3, 5, 7 and 9. All the components were added sequentially to a mixing cup, available under the trade designation "MAX 200 LONG CUP" speed mix cup from Flak Tek Inc., and the composition was mixed for 3 minutes at 3,200 rpm.

TABLE 1

Formulations

| Component | Composition (wt. %) | | | | |
|---|---|---|---|---|---|
| | CE-A | CE-B | Ex. 1 | CE-C | CE-D |
| SUPR | 34 | 24 | — | — | — |
| SDCP | — | | 34 | 34 | 34 |
| HEMA | — | — | — | 17 | — |
| BNMA | — | — | — | — | 17 |
| VAM | 18 | 16 | 17 | — | — |
| TMPTA | | 15 | — | — | — |
| TDEA | 0.4 | 0.2 | — | 0.4 | 0.4 |
| DMPT | — | — | 0.1 | — | — |
| AS | — | 1 | 1 | — | — |
| CC | 33.3 | 25.5 | 20.6 | 32 | 32 |
| Talc | 10 | 13 | 2-2 | 11.3 | 11.3 |
| PW | 0.3 | 0.3 | 0.3 | 0.3 | 0.3 |
| DBQ | 4 | — | — | — | — |
| S-22 | — | 5 | 5 | 5 | 5 |

TABLE 2

Testing Results of the Formulations in Table 1.

| Ex/CE | Surface Tackiness | Sanding | Clogging | Featheredge | Scratch resistance |
|---|---|---|---|---|---|
| CE-A | 0 | 0 | 1 | roll back | 0 |
| CE-B | 0 | 1 | 4 | roll back | 3 |
| Ex. 1 | 4 | 4 | 4 | Yes | 4 |
| CE-C | 2 | 2 | 3 | Yes | 3 |
| CE-D | 2 | 2 | 2 | Yes | 3 |

TABLE 3

Formulations

| Component | Composition (wt. %) | | | | | | | | | | |
|---|---|---|---|---|---|---|---|---|---|---|---|
| | Ex. 2 | Ex. 3 | Ex. 4 | CE-E | CE-F | Ex. 5 | Ex. 6 | CE-G | Ex. 7 | Ex. 8 | Ex. 9 |
| SDCP | 24 | 24 | 24 | 36 | 37 | 38 | 24 | 25 | 24 | 24 | 27 |
| VAM | 16 | 16 | 16 | — | — | — | — | — | 16 | 16 | — |
| VV9 | — | — | — | — | — | 12 | 24 | — | — | — | 6 |
| DVE-2 | — | — | — | — | 18 | 7 | — | — | — | — | 7 |
| DVE-3 | — | — | — | 19 | — | — | — | 18 | — | — | — |
| TMPTA | 15 | 15 | 15 | — | — | — | 6 | 9 | 14 | 14 | 2 |
| AC | — | — | 0.4 | — | — | — | — | — | — | — | — |
| SH | — | 2 | — | — | — | — | — | — | — | — | — |
| EP | — | — | — | — | — | — | — | — | — | — | 8 |
| TDEA | 0.2 | 0.2 | 0.2 | 0.4 | 0.4 | 0.2 | 0.1 | — | 0.2 | 0.2 | 0.2 |
| DMPT | — | — | — | — | — | — | — | 0.1 | — | — | — |
| CBT | — | — | — | — | — | — | — | — | — | 0.2 | — |
| ILH | — | — | — | — | — | — | — | — | 2 | — | — |
| AS | 1 | 1 | 1 | 1 | 1 | 1 | 1 | 1 | 1 | 1 | 1 |
| CC | 26.5 | 25.5 | 26.1 | 22.3 | 22.3 | 10.5 | 26.6 | 27.6 | 21.5 | 23.3 | 16.5 |
| Talc | 12 | 12 | 12 | 16 | 16 | 26 | 13 | 14 | 16 | 16 | 27 |
| PW | 0.3 | 0.3 | 0.3 | 0.3 | 0.3 | 0.3 | 0.3 | 0.3 | 0.3 | 0.3 | 0.3 |
| S-22 | 5 | 5 | 5 | 5 | 5 | 5 | 5 | 5 | 5 | 5 | 5 |

TABLE 4

Testing Results of the Formulations in Table 3.

| Ex/CE | Surface Tackiness | Sanding | Clogging | Featheredge | Scratch resistance |
|---|---|---|---|---|---|
| Ex. 2 | 2 | 4 | 4 | Yes | 4 |
| Ex. 3 | 3 | 4 | 5 | Yes | 5 |
| Ex. 4 | 3 | 4 | 5 | Yes | 5 |
| CE-E | 1 | 3 | 2 | Yes | 3 |
| CE-F | 3 | 3 | 3 | Yes | 4 |
| Ex. 5 | 3 | 3 | 3 | Yes | 4 |
| Ex. 6 | 4 | 4 | 3 | Yes | 3 |
| CE-G | 1 | 4 | 3 | Yes | 4 |
| Ex. 7 | 2 | 4 | 4 | Yes | 4 |
| Ex. 8 | 4 | 5 | 5 | Yes | 5 |
| Ex. 9 | 4 | 4 | 4 | Yes | 5 |

TABLE 5

Formulations

| Component | Composition (wt. %) | | | | |
|---|---|---|---|---|---|
| | CE-H | CE-I | Ex. 10 | Ex. 11 | Ex. 12 |
| VHR | 40 | 17.5 | 19 | 9 | 10 |
| SDCP | 10 | 20 | 19 | 29 | 31 |
| VV9 | — | — | 7 | 7 | 9 |
| DVE-2 | — | 9 | 6 | 6 | — |
| TMPTA | — | 3.5 | — | — | — |
| MTBHQ | 0.05 | 0.05 | 0.05 | 0.05 | 0.05 |

TABLE 5-continued

| Formulations | | | | | |
|---|---|---|---|---|---|
| | Composition (wt. %) | | | | |
| Component | CE-H | CE-I | Ex. 10 | Ex. 11 | Ex. 12 |
| TDEA | 0.2 | 0.3 | 0.3 | 0.4 | 0.2 |
| CBT | 0.3 | 0.2 | 0.15 | 0.15 | 0.15 |
| AS | 1 | 1 | 1 | 1 | 1 |
| CC | 32 | 30.15 | 28 | 28.1 | 18.3 |
| Talc | 10 | 13 | 14 | 14 | 25 |
| PW | 0.4 | 0.3 | 0.3 | 0.3 | 0.3 |
| S-22 | 6 | 5 | 5 | 5 | 5 |

TABLE 6

| Testing Results of the Formulations in Table 5. | | | | | |
|---|---|---|---|---|---|
| Ex/CE | Surface Tackiness | Sanding | Clogging | Featheredge | Scratch resistance |
| CE-H | 3 | 3 | 3 | Yes | 5 |
| CE-I | 3 | 4 | 4 | Yes | 5 |
| Ex. 10 | 4 | 4 | 5 | Yes | 5 |
| Ex. 11 | 4 | 5 | 5 | Yes | 5 |
| Ex. 12 | 5 | 5 | 5 | Yes | 4 |

TABLE 7

| Formulations | | | | | | | |
|---|---|---|---|---|---|---|---|
| | Composition (wt. %) | | | | | | |
| Component | Ex. 13 | Ex. 14 | CE-J | Ex. 15 | Ex. 16 | Ex. 17 | Ex. 18 |
| PMR | 37 | 18.5 | 17 | 17 | 17 | 21 | 20 |
| VHR | — | — | 4 | 4 | 2 | — | — |
| SDCP | — | 18.5 | 17 | 17 | 18 | 12 | 17 |
| EP | — | — | — | — | — | 8 | 4 |
| VV9 | 7 | 7 | | 6 | 7 | 7 | 7 |
| DVE-2 | 7 | 7 | 13 | 7 | 7 | 6 | 6 |
| MTBHQ | 0.05 | 0.05 | 0.05 | 0.05 | 0.05 | 0.05 | 0.05 |
| TDEA | 0.1 | 0.2 | 0.1 | 0.1 | 0.2 | 0.2 | 0.2 |
| CBT | 0.1 | — | 0.1 | 0.1 | — | 0.2 | 0.2 |
| AS | 1 | 1 | 1 | 1 | 1 | 1 | 1 |
| CC | 17.4 | 5.4 | 17.4 | 17.4 | 5.25 | 5 | 5 |
| Talc | 25 | 37 | 25 | 25 | 37 | 34 | 34 |
| PW | 0.3 | 0.3 | 0.3 | 0.3 | 0.3 | 0.3 | 0.3 |
| S-22 | 5 | 5 | 5 | 5 | 5 | 5 | 5 |

TABLE 8

| Testing Results of the Formulations in Table 7. | | | | | |
|---|---|---|---|---|---|
| Formula | Surface Tackiness | Sanding | Clogging | Featheredge | Scratch resistance |
| Ex. 13 | 5 | 5 | 4 | Yes | 3 |
| Ex. 14 | 4 | 5 | 5 | Yes | 4 |
| CE-J | 3 | 4 | 3 | Yes | 5 |
| Ex. 15 | 3 | 4 | 3 | Yes | 5 |
| Ex. 16 | 4 | 5 | 5 | Yes | 5 |
| Ex. 17 | 5 | 5 | 4 | Yes | 5 |
| Ex. 18 | 4 | 4 | 3 | Yes | 4 |

TABLE 9

| Formulations for use at 2/1 Weight Ratio. | | |
|---|---|---|
| | Example 19 Composition (wt. %) | |
| Component | Part A | Part B |
| PMR | 31 | — |
| VHR | — | — |
| SDCP | 19 | — |
| EP | — | 23 |
| VV9 | 3 | 8 |
| DVE-2 | 6 | 12 |
| BHP | — | 6 |
| MTBHQ | 0.03 | 0.03 |
| TDEA | 0.2 | — |
| CBT | 0.2 | — |
| AS | 2 | 2 |
| CC | 0 | 10 |
| Talc | 33 | 34 |
| PW | 0.4 | — |
| S-22 | 5 | 5 |

Ex.19 Part A and Part B compositions were mixed at a 2 to 1 weight ratio, yielding a composition the same as Ex.17, with a corresponding BHP level of 2%. When Ex.19 Part A and Part B were homogeneously mixed and applied to a panel, it produced equal performance as Ex. 17.

Various modifications and alterations of this disclosure may be made by those skilled the art without departing from the scope and spirit of the disclosure, and it should be understood that this disclosure is not to be unduly limited to the illustrative embodiments set forth herein.

What is claimed is:

1. A composition packaged as a two-part body repair composition, wherein a first part comprises:

at least one of a dicyclopentadiene-modified unsaturated polyester resin not having terephthalic acid units or an ethylene glycol fumarate unsaturated polyester resin not having terephthalic acid units;

a vinyl ester represented by formula R—[C(O)—O—CH═CH$_2$]$_n$ wherein R is alkyl having more than one carbon atom, and n is 1 or 2;

a tertiary amine;

inorganic filler; and one or more reactive compounds having at least one of a mercaptan or epoxy group;

and wherein a second part comprises an organic peroxide or organic hydroperoxide.

2. The composition of claim 1, wherein the composition is substantially free of a vinyl aromatic compound comprising at least one vinyl substituent on an aromatic ring.

3. The composition of claim 1, wherein the vinyl ester is represented by formula R—C(O)—O—CH═$CH_2$, wherein R is alkyl having more than one carbon atom and up to four carbon atoms.

4. The composition of claim 1, further comprising a reactive diluent comprising at least one of acrylate groups, methacrylate groups, allyl ether groups, or vinyl ether groups.

5. The composition of claim 1, wherein the one or more reactive compounds having at least one of a mercaptan or epoxy group comprises the epoxy group.

6. The composition of claim 1, wherein the inorganic filler comprises at least one of ceramic beads, silica, hollow ceramic elements, alumina, zirconia, mica, dolomite, wollastonite, fibers, talc, calcium carbonate, or clay.

7. The composition of claim 1, wherein the inorganic filler is non-fibrous.

8. The composition of claim 1, wherein the tertiary amine comprises at least one N,N-dialkyltoluidine, where each alkyl group is independently methyl, ethyl, hydroxyethyl, hydroxypropyl, or isopropyl.

9. A method of repairing a damaged surface, the method comprising:

combining the first part and the second part of the composition of claim 1 to provide a combined composition;

applying the combined composition to the damaged surface; and curing the combined composition on the damaged surface to provide a cured composition.

10. The method of claim 9, wherein the damaged surface is on at least a portion of a vehicle.

11. The method of claim 9, wherein curing is carried out at room temperature.

12. The composition of claim 1, wherein the composition comprises the dicyclopentadiene-modified unsaturated polyester resin.

13. The composition of claim 12, wherein the dicyclopentadiene-modified unsaturated polyester resin comprises a dicyclopentenyl-end-capped unsaturated polyester resin.

14. The composition of claim 1, wherein the composition comprises the ethylene glycol fumarate unsaturated polyester resin, which comprises at least a portion represented by formula —$(OCH_2CH_2)_p$—O—[C(O)—CH—CH—C(O)—$(OCH_2CH_2)_p$—O$]_m$—, wherein the double bond is a trans double bond, and wherein m is in a range from 1 to 100 and p is in a range from 1 to 10.

15. The composition of claim 1, further comprising a metal salt of a carboxylic acid.

16. A composition packaged as a two-part body repair composition, wherein a first part comprises:

at least one of a dicyclopentadiene-modified unsaturated polyester resin or an ethylene glycol fumarate unsaturated polyester resin;

a vinyl ester represented by formula R—[C(O)—O—CH═$CH_2]_n$ wherein R is alkyl, aryl, or a combination thereof, and n is 1 or 2;

a tertiary amine;

inorganic filler;

a reactive diluent comprising at least one of an acrylate group, a methacrylate group, or a vinyl ether group; and a reactive compound having an epoxy group;

and a second part comprises an organic peroxide or organic hydroperoxide, wherein the composition is free of reactive compounds having a mercaptan group.

17. The composition of claim 16, wherein R is alkyl having up to four carbon atoms.

18. The composition of claim 16, further comprising a metal salt of a carboxylic acid.

19. The composition of claim 16, wherein the inorganic filler comprises at least one of ceramic beads, silica, hollow ceramic elements, alumina, zirconia, mica, dolomite, wollastonite, fibers, talc, calcium carbonate, or clay.

20. The composition of claim 16, wherein the tertiary amine comprises at least one N,N-dialkyltoluidine, where each alkyl group is independently methyl, ethyl, hydroxyethyl, hydroxypropyl, or isopropyl.

* * * * *